(12) United States Patent
Myllenbeck et al.

(10) Patent No.: US 10,732,304 B1
(45) Date of Patent: Aug. 4, 2020

(54) HYDROTHERMAL AGING-RESISTANT PLASTIC SCINTILLATOR FORMULATIONS

(71) Applicant: National Technology & Engineering Solutions of Sandia, LLC, Albuquerque, NM (US)

(72) Inventors: Nicholas Myllenbeck, Livermore, CA (US); Patrick L. Feng, Livermore, CA (US); Rakia Dhaoui, Mountain House, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 180 days.

(21) Appl. No.: 15/966,953

(22) Filed: Apr. 30, 2018

Related U.S. Application Data

(60) Provisional application No. 62/633,955, filed on Feb. 22, 2018.

(51) Int. Cl.
| | |
|---|---|
| *C08L 71/08* | (2006.01) |
| *C08F 230/06* | (2006.01) |
| *C08F 226/10* | (2006.01) |
| *C08F 220/18* | (2006.01) |
| *G01T 1/203* | (2006.01) |

(52) U.S. Cl.
CPC ............ *G01T 1/2033* (2013.01); *C08L 71/08* (2013.01); *C08F 220/18* (2013.01); *C08F 226/10* (2013.01); *C08F 230/06* (2013.01)

(58) Field of Classification Search
None
See application file for complete search history.

(56) References Cited

U.S. PATENT DOCUMENTS

| | | | |
|---|---|---|---|
| 3,041,287 A | 6/1962 | Hyman, Jr. | |
| 3,356,616 A | 3/1964 | Sandler et al. | |
| 5,961,923 A * | 10/1999 | Nova | B01J 19/0046 422/527 |
| 6,136,274 A * | 10/2000 | Nova | B01J 19/0046 422/509 |
| 6,329,139 B1 * | 12/2001 | Nova | B01J 19/0046 209/597 |
| 6,340,588 B1 * | 1/2002 | Nova | B01J 19/0046 435/287.1 |
| 8,698,086 B2 | 4/2014 | Cherepy et al. | |
| 9,234,968 B1 | 1/2016 | Cherepy et al. | |
| 9,796,921 B2 * | 10/2017 | Pecinovsky | C09K 11/06 |

(Continued)

OTHER PUBLICATIONS

Bertrand, et al., "Influence of Bisumuth Loading in Polystyrene-Based Plastic Scintillators for Low Energy Gamma Spectroscopy", In Journals of Materials Chemistry C, vol. 2, 2014, pp. 7304-7312.

(Continued)

*Primary Examiner* — Peter A Salamon
(74) *Attorney, Agent, or Firm* — Medley, Behrens & Lewis, LLC (57) ABSTRACT

A plastic scintillator includes an anti-fog additive or comonomer. The plastic scintillator is formulated to resist the development of hydrothermally-induced aging defects (e.g. discoloration and "fogging") while maintaining scintillation light output and other desirable physical properties.

20 Claims, 4 Drawing Sheets

(56) References Cited

U.S. PATENT DOCUMENTS

| | | | |
|---|---|---|---|
| 2004/0178388 A1* | 9/2004 | Mumper | B82Y 30/00 |
| | | | 252/301.17 |
| 2006/0054863 A1* | 3/2006 | Dai | B82Y 10/00 |
| | | | 252/301.4 R |
| 2011/0315885 A1 | 12/2011 | Cherepy et al. | |
| 2016/0355729 A1* | 12/2016 | Pecinovsky | C09K 11/06 |
| 2018/0265775 A1* | 9/2018 | Zaitseva | C09K 11/025 |

OTHER PUBLICATIONS

Cherepy, et al, "Bismuth-And Lithium-Loaded Plastic Scintillators for Gamma and Neutron Detection", In Nuclear Instruments and Methods in Physics Research Section A: Accelerators, Spectrometers, Detectors and Associated Equipment, vol. 778, 2015, pp. 126-132.

Eriksson, et al, "Comparative Studies on Plastic Scintillators—Applications to Low Energy High Rate Photon Detection" In Nuclear Instruments and Methods, vol. 122, 1974, pp. 373-376.

Loef, et al., "Gamma-Ray Spectroscopy and Pulse Shape Discrimination With a Plastic Scintillator", In Nuclear Instruments and Methods in Physics Research Section A: Accelerators, Spectrometers, Detectors and Associated Equipment, vol. 788, 2015, pp. 71-72.

Mitsumori, et al., "Synthesis and Color Tuning Properties of Blue Highly Fluorescent Vinyl Polymers Containing a Pendant Pyrrolopyridazine", In Macromolecules, vol. 38, 2005, pp. 4698-4704.

Rupert, et al, "Bismuth-Loaded Plastic Scintillators for Gamma-Ray Spectroscopy", In EPL (Europhysics Letter), vol. 97.2, 2012, p. 22002.

* cited by examiner

HYDROTHERMAL AGING-RESISTANT PLASTIC SCINTILLATOR FORMULATIONS

CROSS-REFERENCE TO RELATED APPLICATION

This application claims the benefit of priority of U.S. Provisional Patent Application Ser. No. 62/633,955, filed Feb. 22, 2018, and entitled "Hydrothermal Aging-Resistant Plastic Scintillator Formulations," the entirety of which is incorporated herein by reference.

GOVERNMENT RIGHTS

This invention was made with Government support under Contract No. DE-NA0003525 awarded by the United States Department of Energy/National Nuclear Security Administration. The U.S. Government has certain rights in the invention.

FIELD

This disclosure relates to materials that can be used as scintillators.

BACKGROUND

Scintillators are materials that emit flashes or pulses of light when they interact with ionizing radiation. Scintillator crystals are widely used in radiation detectors for gamma-rays, X-rays, cosmic rays, and particles characterized by an energy level of greater than about 1 keV. It is possible to make radiation detectors, by coupling the crystal (or scintillator) with an element for detecting the light produced by the crystal when it interacts, or "scintillates," when exposed to a source of radiation. The photo-detector produces an electrical signal proportional to the intensity of the scintillation (or light pulses received from the scintillator material). The electrical signal is then processed in various ways to provide data on the radiation.

Gamma-ray spectroscopy is an important capability for radioactive isotope identification and is typically accomplished using inorganic scintillators or inorganic semiconductors. Recent advances have resulted in exceptional spectroscopic performance from both of these classes, yielding 662 keV energy resolution values of less than 3% for scintillator and less than 1% for semiconductors. However, high detector costs and low production yields remain as two significant shortcomings that prohibit their replacement of NaI(Tl) scintillators in large-scale applications.

Organic-based plastic and liquid scintillators have been proposed and investigated as an alternate paradigm that foregoes high-resolution gamma-ray spectroscopy in favor of high-efficiency detection. Plastic compounds provide a low-cost solution for large-volume scintillators. Plastic scintillators deployed in various applications including portal monitoring applications have been shown to be vulnerable to environmentally-induced aging processes that are detrimental to their optoelectronic performance. Light scattering "fog," comprising condensed water vapor beyond the saturation limit of the plastic is one example of an aging defect often encountered in plastic scintillators.

SUMMARY

In an embodiment, a plastic scintillator includes an aromatic polymeric matrix, a primary and secondary fluorophore, and an anti-fog agent. The anti-fog agent is a chemical species that includes an aromatic group, a heteroaromatic group, or a non-aromatic cyclic or heterocyclic group; an oxygen-containing functional group; and, optionally, a linking group selected from the group consisting of: a C1 to C20 alkyl group or chain, an ethylene glycol or polyethylene glycol group, or boron. If the optional linking group is not present, the aromatic group is bonded directly to the oxygen-containing functional group; and if the optional linking group is present, the aromatic or heteroaromatic group is bonded to the optional linking group, and the oxygen-containing functional group is also bonded to the optional linking group.

In an embodiment, a plastic scintillator includes a primary and secondary fluorophore; and an aromatic polymeric matrix that includes polymerized monomers of styrene, vinyltoluene, or mixtures thereof, and a polymerized anti-fog comonomer. The anti-fog comonomer is a vinyl pyrrolidone monomer, a monomer comprising a substituted or unsubstituted aromatic group and an acrylate or alcohol group, or a combination thereof.

DETAILED DESCRIPTION

Various technologies pertaining to scintillator materials are described herein. In the following description, for purposes of explanation, numerous specific details are set forth in order to provide a thorough understanding of one or more aspects. It may be evident, however, that such aspect(s) may be practiced without these specific details. Except when the context clearly indicates the contrary, the term "polymer" is meant to also encompass copolymers.

A product, method, and system includes a plastic scintillator that can resist the development of hydrothermally-induced aging defects (e.g. discoloration and "fogging"), while maintaining comparable scintillation light output to commercial reference materials and commercially acceptable costs and availability. In some exemplary embodiments, the formulations have been scaled to large sizes (e.g. 200 g), facilitating simple transfer to commercial production companies.

To combat these effects, the plastic scintillators disclosed herein can significantly increase the solubility of water in the matrix, thus preventing phase-separation or 'fog' formation between 55° C. and −35° C. while maintaining similar radioluminescence light output to commercial reference materials. In addition, the teachings disclosed herein can also be used to analyze and characterize discoloration of scintillator plastics that are exposed to elevated temperatures in aerobic environments and a set of reaction and formulation rules to prevent this aging defect.

The scintillating material includes an aromatic polymeric matrix, a primary and secondary fluorophore, and an anti-fog agent. The anti-fog agent can be either an additive that is dispersed in the aromatic polymeric matrix or a comonomer incorporated into the polymer itself. In another embodiment, additional additives are provided.

In an embodiment, the polymeric matrix includes a polymer containing polymerized aromatic-group containing monomer units, such as styrene or vinyltoluene, or mixtures thereof. For example, the aromatic polymeric matrix may comprise poly(styrene), poly(vinyltoluene), or mixtures thereof. In an embodiment, the aromatic polymeric matrix further includes a polymer containing polymerized vinyl-group containing monomer units, a polymer containing polymerized acrylate-group containing monomer units, a copolymer containing one or more of polymerized vinyl-group containing monomer units, polymerized acrylate-group containing monomer units, and polymerized aromatic-group containing monomer units, or a combination thereof.

In an embodiment, co-polymers of vinyl-group and terephthalate-group containing monomers may be used in the aromatic polymeric matrix. Copolymers of vinyl-group and/or terephthalate-group containing monomers with other monomers may also be used. In an embodiment, polymers may be selected, for example, from the group consisting of polystyrene ("PS"), polyvinyltoluene ("PVT"), poly(9-vinylcarbazole), poly(methyl methacrylate), poly(ethylene terephthalate), or combinations thereof. In an embodiment, a combination of a vinyl-group containing polymer and a terephthalate group containing polymer is used. The vinyl-group containing polymer and terephthalate group polymer combination may, for example, be present in a weight ratio of 0.01 to 100 (vinyl-group containing polymer): 100 to 0.01 (terephthalate group polymer), such as, for example, 0.1 to 10: 10 to 0.1, or 0.5 to 1 to 1 to 0.5. Other copolymers may comprise different monomer units with the same ratios.

In an embodiment, the plastic polymer may, for example, have a weight average molecular (Mw) weight ranging from 40,000 to 1,000,000, such as 100,000 to 700,000, or 150,000 to 500,000. The plastic polymer may, for example, have a number-average molecular weight (Mn) of 20,000 to 900,000, 50,000 to 500,000, or 100,000 to 300,000. The plastic polymer may, for example, have a Mw/Mn of 1.01 to 5, such as 1.2 to 4, or 1.3 to 3. In an embodiment, the plastic polymer may have glass transition temperature (Tg) of 40 to 150° C. For example, in an embodiment for gamma-ray spectroscopy only, Tg values in the range of 70 to 160° C. are expected. In an embodiment with compositions that provide gamma-ray spectroscopy and neutron/gamma pulse-shape discrimination, Tg values in the range of 40 to 80° C. are anticipated, owing to the higher concentration of primary fluorophore (up to 30% by weight of the total composition). The fluorophore acts as a plasticizer at these higher concentrations. In an embodiment with samples that are cross-linked, such as by using greater than 3% (such as, up to 10%) by weight of the total composition of a vinyl- or methacrylate-based cross-linker, Tg values of up to 165° C. are possible.

The plastic polymer should have high transparency, such as, for example, 75% to 100% light transmittance, such as 80% to 85%, 90% to 98%, or 92% to 97%. Test conditions from ASTM D1003-13 may be used to determine light transmittance.

In an embodiment, when an aromatic compound is used in the matrix, the aromaticity of the compound may, for example, be 40% to 100%, such as, for example, 70% to 98%, or 80% to 95% aromatic compounds by weight.

In an embodiment, the scintillating compositions described herein include a primary fluorophore in the concentration range of 0.5-10% by weight of the total composition, such as, for example, 0.8 to 5%, or 1 to 2%. In an embodiment, the primary fluorophore may be selected from: 2,5-diphenyloxazole (PPO), 2,5-diphenyl-1,3,4-oxadiazole (PPD) 2-(4-tert-butylphenyl)-5-(4-biphenylyl)-1,3,4-oxadiazole (butyl-PBD), or p-terphenyl. Compositions containing high concentrations of primary fluorophore (5-30% w/w) may be configured to exhibit both gamma-ray spectroscopy and neutron/gamma pulse-shape discrimination.

In an embodiment, the scintillating compositions described herein also contain a secondary fluorophore in the concentration range of 0.01 to 0.5% by weight of the total composition, such as, for example, 0.05 to 0.2%, or 0.8 to 0.15%. The secondary fluorophore may be a wavelength-shifting fluorophore and may be selected from: 1,4-bis(5-phenyl-2-oxazolyl)benzene (POPOP), 9, 10-diphenylanthracene, 1,4-bis(2-methylstyrl)benzene (bisMSB), or 2-(1-naphthyl)-5-phenyloxazole (NPO).

In an embodiment, the anti-fog agent includes an aromatic group, a heteroaromatic group, or a non-aromatic cyclic or heterocyclic group; an oxygen-containing functional group; and an optional linking group selected from the group consisting of: a $C_1$ to $C_{20}$ alkyl group or chain, an ethylene oxide or polyethylene oxide group, or boron, wherein if the optional linking group is not present the aromatic group is bonded directly to the oxygen-containing functional group; and if the optional linking group is present, the aromatic or heteroaromatic group is bonded to the optional linking group, and the oxygen-containing functional group is also bonded to the optional linking group. In an embodiment, the oxygen-containing functional group and the aromatic group are bonded to opposite terminal ends of the linking group. In an embodiment, the anti-fog agent includes an aromatic group, an alkyl chain of at least 2 carbon atoms bonded to the aromatic group, and an oxygen-containing functional group bonded to the alkyl chain or aromatic group. In an embodiment, the aromatic group is a benzene group that may or may not include additional substitutions other than those required for the alkyl group and/or oxygen-containing functional group, such as aryl alcohol or aromatic polyol. In an embodiment, the heteroatomic group includes a nitrogen atom in the ring, and, for example, may be substituted or unsubstituted pyridine. In an embodiment, the oxygen-containing functional group is an alcohol, a carboxylic acid, an ethylene oxide or polyethylene oxide, or combinations thereof. A combination thereof includes, for example, a polyethylene oxide group bonded to the aromatic group and terminating in a hydroxide group. The alkyl chain may be linear, branched, or cyclic, and include, for example, 2 to 30 carbon atoms, such as 3 to 10, or 5 to 9. The term "group" is meant to encompass groups optionally with additional substituents, such as, an aromatic group can include a benzene ring group with a alkyl chain substituent.

In an embodiment, the anti-fog agent is selected from the following classes of compounds:
  an aryl alcohol or aromatic polyol;
  a cyclic, non-aromatic alcohol or polyol thereof;
  a boronic acid (aryl or cyclic, non-aromatic);
  a non-ionic surfactant;
  a carboxylic acid (aryl or cyclic, non-aromatic); or
  an amine (aryl or cyclic, non-aromatic).

In an embodiment, the anti-fog agent is a nonionic surfactant. In an example of the nonionic surfactant, the linking group is present and comprises a hydrophilic polyethylene glycol chain, and the aromatic group comprises an aromatic hydrocarbon lipophilic or hydrophobic group. An example, of such are those sold under the TRITON name and include derivatives of 4-octylphenoxy-oligoethyleneglycol, with a variable ethylene glycol chain length. The ethylene glycol group may, for example, have n repeating ethylene glycol units, where n is 4 to 30, such as 5 to 10, or 6 to 8. In such an embodiment, the polyethylene oxide group may be bonded to a terminal hydroxyl group. For example, the nonionic surfactant may be TRITON X-100, TRITON X-114, TRITON X-45, TRITON N, and TRITON X. The nonionic surfactant may be present in an amount of 0.5 to 5% by weight, 1 to 4%, or 2 to 3% by weight. The nonionic surfactant can function well without a cross-linking agent and sequesters a high volume of water, possibly because of its ability to form micelles in the plastic matrix.

The anti-fog agent has a relatively low molecular weight, such as a number average molecular weight of 100 to 1000 g/mol, 115 to 750 g/mol, or 125 to 550 g/mol. In an embodiment, the anti-fog agent is one or more species selected from formulas I-III.

I.

II.

III.

The species represented by formula I—III are known respectively, as 3-phenyl-1-propanol (3P1P), (1,1,3,3-tetramethylbutyl)phenyl-polyethylene glycol (TRITON X family), and hydrocinnamic acid. In an embodiment, the alkyl chains of these species can be varied by 1 to 15 carbons (with associated hydrogens), and the value of n can vary from 1 to 20, such as 5 to 15, or 7 to 13. In the case of styrene, the double bond would remain in the allyl position.

The anti-fog agent used as an additive to the plastic matrix, may also be selected from, hydrocinnamic acid, benzyl alcohol, 2-phenylethan-1-ol, 3-phenylpropan-1-ol, 1,2-phenylenedimethanol, pyridine, 2-phenoxy-1-ethanol, phenylacetic acid, o-tolylboronic acid, 2-methoxyboronic acid, and cyclohexylboronic acid, or combinations thereof.

The anti-fog agent may also or alternatively be an additive that resists discoloration in the scintillator. In an embodiment, the anti-fog agent is present in a weight percentage of 0.1 to 30% by weight, such as, for example, 1 to 5% by weight, or 2 to 3.5% by weight. In an embodiment, the anti-fog agent does not decrease the scintillation light yield of the scintillator by more than 10% compared to the same plastic scintillator not including an anti-fog agent and can be comparable. In an embodiment, the anti-fog agent does not plasticize the plastic scintillator.

In an embodiment, the anti-fog agent may be a comonomer incorporated into the plastic polymer of the polymeric matrix. A copolymer of an aromatic monomer (e.g. styrene) and an anti-fog comonomer may be used to achieve a lower off-gassing alternative to the non-polymerizable anti-fog compounds. Some comonomers may also provide improved optical quality through improved solubility/miscibility of the fluorophore within the copolymer matrix.

In an embodiment, the primary polymerized monomer units (e.g., 50% of the monomer units or greater) are selected from the group consisting of: styrene or vinyltoluene, or mixtures thereof. (Any and all isomers of vinyltoluene are included.) In an embodiment, blends of polystyrene and poly(methyl methacrylate) may be employed to achieve improved hardness and optical quality.

In an embodiment, the comonomer anti-fog agent is a free-radical copolymerizable monomer, and may be selected from the group consisting of: a vinyl pyrrolidone monomer, a monomer comprising an acrylate group, a monomer comprising an alcohol group, a monomer comprising boronic acid, or a combination thereof. In an embodiment, the comonomer anti-fog agent is selected from the group consisting of: benzyl methacrylate, 4-vinylbenzyl alcohol, N-vinylpyrrolidone, (4-vinylphenyl)boronic acid, or 2-hydroxyethylmethacrylate. Optionally, the free-radical copolymerizable monomer may also include a substituted or unsubstituted aromatic group. Comonomers may be employed in an amount of 0.1 to 30% by weight of the copolymer, such as 1% to 20%, or 3% to 8%.

Crosslinker agents, such as cross-linking monomers, may be present in the polymer matrix in an amount of 0.01 to 5 weight percent, such as 0.1% to 5%, or 2% to 4%, based on the total weight of the scintillating composition. The crosslinker agents may be members of the diacrylate or dimethacrylate classes. Examples of crosslinker agents include glycerol-1,3-diglycerolate diacrylate, ethylene glycol diacrylate (with n ethylene glycol units ranging from 1 to 5), ethyleneglycol dimethacrylate (with n ethylene glycol units ranging from 1 to 5), 1,6-hexanediol dimethacrylate, 1,4-butanediol dimethacrylate, 1,4-phenylene dimethacrylate, poly(propylene glycol) dimethacrylate, bisphenol A dimethacrylate, diethyleneglycol dimethacrylate, triethylene glycol dimethacrylate (TEGDMA), tetraethyleneglycol dimethylacrylate, 2,2-bis[4-(2-hydroxy-3-methacryloxypropoxy)phenyl]propane, and tricyclodecane dimethanol diacrylate.

Free-radical initiators may also be used in conjunction with heating, UV, or radiolysis to control the rate and extent of bulk polymerization. Examples of organic peroxide free-radical initiators include lauroyl peroxide, benzoyl peroxide, tert-butyl hydroperoxide, and 2-butanone peroxide. Examples of azo-based free-radical initiators include azobisisobutyronitrile, 4,4'-azobis(4-cyanovaleric acid), and 2,2'-azobis(2-methylpropionitrile).

Plasticizers may be present in the plastic scintillators, which may change the thermal and mechanical properties of the material. In other embodiments, plasticizers may comprise an organic molecule such as 2,5-diphenyloxazole (PPO), which is recommended for plastics that exhibit gamma-ray spectroscopy and neutron/gamma PSD capabilities. Plasticizers may be used in conjunction with the cross-linking agents described above to modify the thermal and mechanical properties to meet application requirements. In general, plasticizers increase the free volume in the polymer and decrease the glass-transition temperature, whereas cross-linkers decrease the free volume in the polymer and increase the glass-transition temperature. In an embodiment, the plastic scintillator is exclusive of a crosslinking agent, particularly in combination with the nonionic surfactant anti-fog agent, such as 1,1,3,3-tetramethylbutyl)phenyl-polyethylene glycol (TRITON X compounds).

An example process for making a fog-resistant plastic scintillator comprises the method set forth herein.

In an inert atmosphere the anti-fog agent (as an additive or a comonomer) is dissolved in or mixed with a matrix monomer (e.g., styrene or 4-vinyltoluene) in a concentration mentioned above corresponding to the anti-fog component.

Then the primary fluorophore is dissolved in a weight percentage mentioned above. Concentrations of 0.5-3 wt. % are more suitable for gamma-spectroscopy only, whereas concentrations greater 3%, such as 4 to 10%, or 12 to 25% are more suitable for dual-mode gamma-spectroscopy and neutron/gamma PSD.

Next the secondary fluorophore is added and dissolved in a weight percentage range mentioned above for secondary fluorophore.

Optionally, a co-monomer and/or cross-linker may be added and dissolved at a concentration of 0.5 to 15 wt. % or other weight percentage range mentioned above for these components.

Optionally, a radical initiator may be added and dissolved in an amount effective to initiate polymerization. The radical initiator may comprise, for example, AIBN or an organic peroxide.

Optionally, pre-treatment methods may be employed including silanization of the glass reaction vessel and/or sonication to facilitate extraction of the solid polymer puck post-reaction.

In an embodiment, the reaction mixture is transferred to a heavy-walled glass reaction vessel prior to polymerization. At that point, the reaction vessel is sealed and heated to a defined polymerization temperature in an oven or using a heat transfer fluid (oil, water, etc.). The heating and cooling ramp rate is controlled for cross-linked samples to avoid potential cracking due to the buildup of hydrostatic stress.

In an embodiment, alternate procedures are used when using fog-resistant or hydrothermal aging-resistant additives that possess high vapor pressures, e.g., compounds having a boiling point of less than 100° C., such as 20° C. to 85° C., or 55° C. to 80° C. at the elevated temperatures typically employed in typical thermal polymerization reactions (i.e. 100 to 130° C.). Attempted polymerization at high temperatures such as above 70° C. may lead to inhomogeneous incorporation within the polymer matrix, owing to minimal solubility and a preference for existing in the vapor phase. Attempted linear polymerization at temperatures below 70° C. may lead to high residual monomer ratios even after long heating times. In such embodiments, the issue is addressed by implementing an additive(s) that increases the polymerization activity and thus allows for lower temperatures. Examples of such additives include cross-linking additives such as triethyleneglycol dimethacrylate (TEGDMA) or others mentioned above in concentrations of 0.5% to 15% by weight of the total composition, such as 1 to 10%, or 2 to 5% by weight. This allows for polymerization conditions that yield beneficial properties.

Thermal stresses may be introduced in cross-linked materials and this should be taken into account when performing larger-scale polymerizations to avoid potential failure via fracture. This can be addressed by adjusting the heating/cooling rate, stirring/recirculation rate, polymerization temperature, polymerization vessel material, and heat-transfer medium.

In an embodiment, alternate procedures are utilized when co-polymerizing the anti-fog agent with the host matrix. The polymerization process in such case should be modified to achieve controlled polymerization from the gelation stage through the final polymerization stage. This is to achieve the lowest residual (i.e. unreacted) monomer ratio. Residual monomer has been shown to have deleterious effects upon the physical/mechanical properties, long-term stability, and the scintillation light yield. In an embodiment, the copolymerization conditions involve pre-polymerization at 70° C. for 4 hours, followed by final polymerization at 110-115° C. for 3 days.

In an embodiment, the scintillator material is mechanically rigid at room temperature, for example, with a Shore D hardness (ASTM D2240 00) of 15 or greater, such as 20 to 100, or 40 to 60. The scintillator material, may be dimensioned to fit various applications. Example geometries are cylindrical, cubical, or prismatic, and each of the dimensions (height, length, width, diameter) may independently range, for example, from 5 inches to 0.01 inches, 3 inches to 0.25 inches, and 2 inches to 0.5 inches. Sample masses may range up to, for example, 1 kg, or up to 300 g, such as 100 g to 200 g, or 130 g to 175 g.

In an embodiment, a scintillation light yield of at least 60%, such as 65% to 125%, 70% to 100%, or 101% to 105% that of a commercial reference plastic scintillator (EJ-200 from Eljen Technology) is maintained in a custom scintillator that does not contain an anti-fog agent. EJ-200 has been well-characterized in the literature to possess absolute scintillation light yields of 10,000 photons/MeVee when evaluated with a bialkali photomultiplier tube and integrated using a 250 ns-1 μs shaping time. (The same evaluation method would be used to determine the comparative light yield of the scintillators disclosed herein.)

The scintillating materials disclosed herein may be used for isotope identification in applications that require high detection efficiency (large-volume) and significantly lower cost than achievable using inorganic scintillators or semiconductors. A specific example of a preferred application comprises radiation portal monitors (RPMs) used at ports-of-entry to a country. Currently, RPMs are based on large panels (i.e. 14"×68"×3") of conventional plastic scintillators. These portals are incapable of gamma-ray spectroscopy and therefore subject to relatively high false alarm rates from benign gamma-ray backgrounds. Replacement of conventional plastic scintillators with the scintillating materials disclosed herein would increase the environmental stability of conventional materials, while not significantly impacting scintillation light output, mechanical properties, or manufacturing aspects already optimized for conventional plastic scintillators. The introduction of environmental aging resistance is additionally expected to be transferrable to other specialty plastic scintillator formulations, such as pulse shape discriminating plastics and spectroscopic plastics.

EXAMPLES

Synthesis of Examples

All reagents used were either purchased from SIGMA-ALDRICH, and purified as detailed, or synthesized in-house as explained. Styrene and vinyltoluene were purified by vacuum filtration over a 2.5" diameter, 3" tall plug of basic alumina to remove inhibitor. Primary fluorophores were recrystallized using mixtures of hexane and chloroform, or from toluene. 1,4-bis(2-methylstyryl)benzene (bis-MSB) and 1,4-bis(5-phenyloxazol-2-yl)benzene (POPOP) were used as received. Fog-resistant, non-polymerizable additives were used as received.

Copolymerizable additives, with the exception of 4-vinylbenzylalcohol, were purchased from Sigma-Aldrich and purified by distillation (N-vinylpyrrolidone) or by washing a dichloromethane solution of the monomer with aqueous sodium hydroxide, then drying over $MgSO_4$, removing the $MgSO_4$ by gravity filtration, and removing the dichloromethane in vacuo (for methacrylate monomers). Dimethacrylate crosslinkers were purified using the same method as the methacrylates above.

4-vinylbenzylalcohol was synthesized in 60% yield, beginning with 4-vinylbenzyl chloride, following a published procedure (Mitsumori, T., Craig, I. M., Martini, I. B., Schwartz, B. J., Wudl, F. *Synthesis and Color Tuning Properties of Blue, Highly Fluorescent Vinyl Polymers Containing a Pendant Pyrrolopyridazine.* Macromolecules 2005, 38, 4698-4704 incorporated herein by reference).

Fog-resistant plastic scintillators were prepared by combining monomer, fluorophores, aging-resistant additives and crosslinker in the desired proportion, in an oven-dried, glass container under inert atmosphere. Following mixture to full dissolution, the pre-polymer mixture was heated from room temperature to 80° C., and held at 80° C. for 3 days, followed by ramping to 115° C. and holding for 4 days. Upon reaching the end of the polymerization period, samples were cooled to room temperature and percussively extracted from their vessels. The raw polymer pucks were polished to size using a diamond-tipped lathe. No initiator was used and random polymers were produced.

The following testing conditions were used in evaluating the Examples herein. Effects of hydrothermal aging on scintillator pucks were assessed by comparing scintillation light yield, optical images, and UV-Visible absorbance spectra, before and after an aging period sufficient to test fogging resistance (moisture uptake saturation time, which was determined to be 21 days, verified by samples observed for up to 3 months. These samples were aged t a stable temperature and relative humidity (R.H.) of 55° C., 100% R.H., for at least 21 days to simulate the most extreme environmental conditions relevant to the material application, and to accelerate any aging effects to be observed. All examples were determined to be at constant mass in their hydrothermal environment, they were removed and cooled to room temperature at 1° C./minute, whereupon their scintillation response and optical transparency were assessed. Then, the samples were cooled to −20° C. and re-analyzed for optical transparency.

Scintillation response: Polished polymer pucks were characterized for their radioluminescent response to Cs-137 gamma irradiation: using silicone optical grease, a polymer puck was optically coupled to a HAMAMATSU H3177 photomultiplier tube assembly, which was in turn, connected to an ORTEC pulse shaper. The digitized pulses were integrated over a time interval of 200 ns and histogrammed to provide gamma-irradiation pulse height spectra. This straightforward data acquisition configuration was set up to approximate a realistic measurement scenario and was not optimized for any particular sample. Scintillation measurements were collected for samples both before and after hydrothermal aging to uptake saturation.

Optical transmission: Scintillator resistance to fogging and discoloration effects (collectively aging effects), was verified both qualitatively using optical photography, and quantitatively with UV-Visible spectrophotometry. UV-Visible spectrophotometry was used to more sensitively determine fog onset temperatures, and optical transparencies, with use of a custom-built, variable temperature sample holder.

Examples 1-3

Four plastic scintillators were made and tested. Example 1 and 3 were 2.5" diam.×1.5" tall cylinders. Example 2 was an 0.875" diam.×0.5" tall cylinder.

The constituents of each example are shown in Table 1. Each of the plastic scintillators disclosed in Table 1 showed a fog temperature below −20° C.

TABLE 1

| | Plastic matrix | Fog-resistant additive | Fluorophores | Crosslinker | Max. Scintillation Light Yield vs EJ-200 reference |
|---|---|---|---|---|---|
| Example 1 | PS/PVT (remainder of weight %) | 5% 3-phenyl-1-propanol | 2% PBD, 0.1% bisMSB | 1% TEGDMA | 97.7% |
| Example 2 | PS/PVT (remainder of weight %) | 2.5% TRITON X-114 | 2% butyl-PBD, 0.1% bisMSB | None | 96.2% |
| Example 3 | PS/PVT (remainder of weight %) | 5% hydrocinnamic acid | 2% butyl-PBD, 0.1% bisMSB | 2% TEGDMA | 83.7% |

Figure 1:
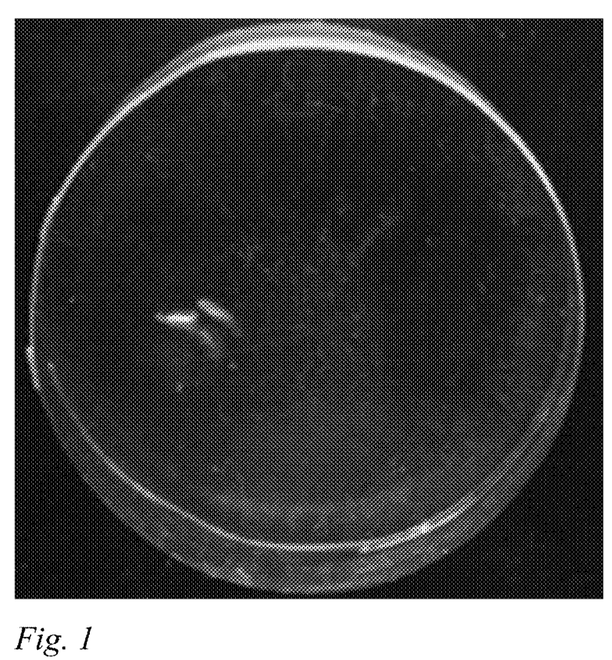
FIG. 1 is a photograph of a first fog-resistant plastic scintillator.
Figure 2:
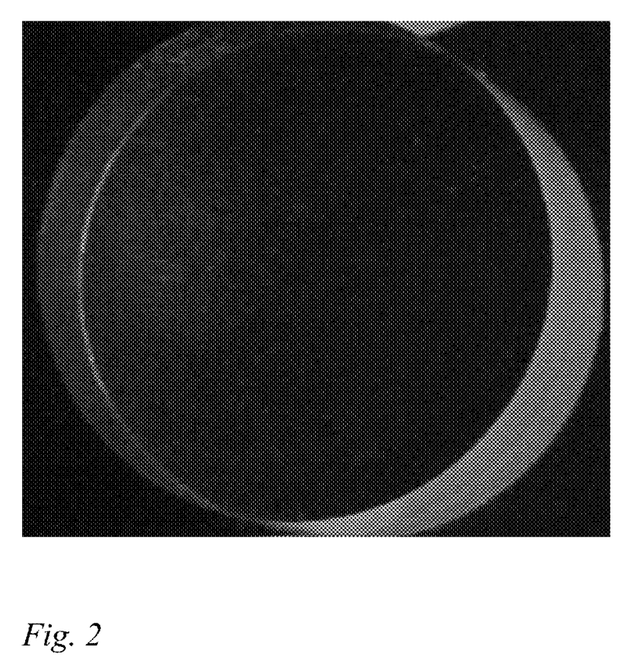
FIG. 2 is a photograph of a second exemplary fog-resistant plastic scintillator.
Figure 3:
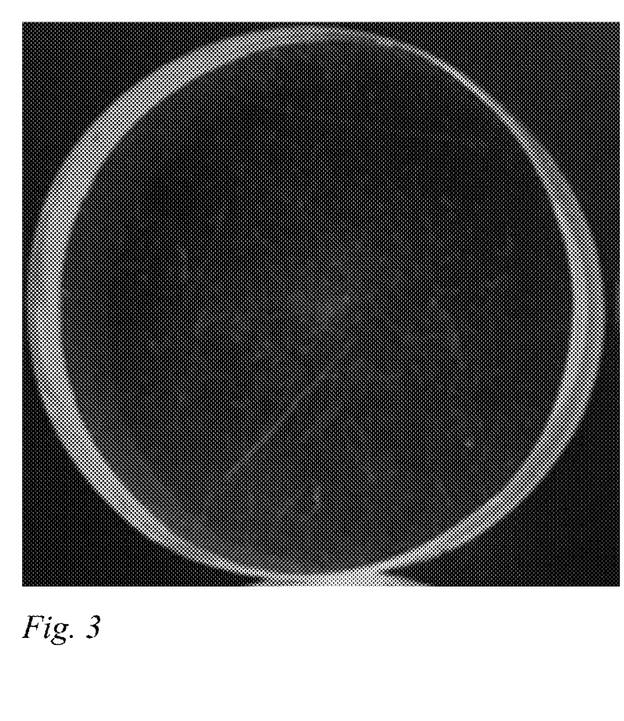
FIG. 3 is a photograph of a third exemplary fog-resistant plastic scintillator.

FIGS. 1-3 are photos of these examples, in respective order.

Example 4

Figure 4:
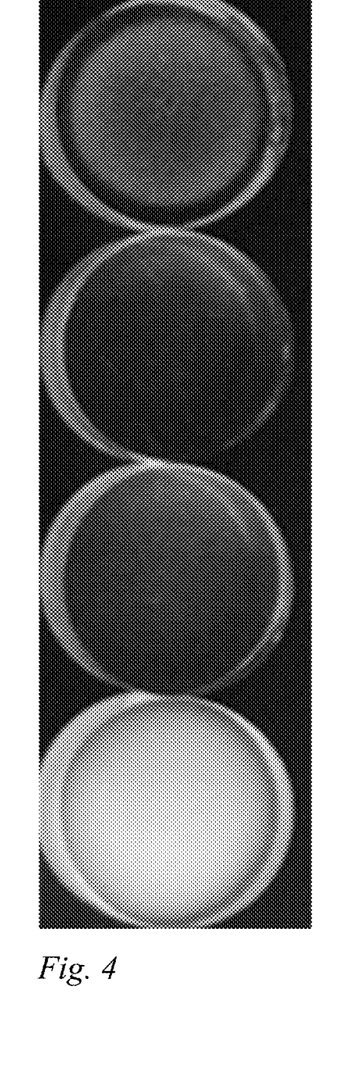
FIG. 4 is a photograph of a series of fog-resistant plastic scintillators with varying anti-fog agent contents.

In Example 4, the Example 3 composition above was modified by applying different weight percentages of the fog-resisting agent. Concentrations of 1%, 2.5%, 5%, and 10% by weight of the total compound were used. FIG. 4 is a photo showing the varying clarity of the plastic scintillators according to the concentration of the fog-resistant additive after the aging under the conditions disclosed above.

Example 5-11

Additional fog resistant plastic scintillators were synthesized and tested as described above with results shown in Table 2 below.

TABLE 2

| | Composition (0.875" diam. × 0.5" tall cylindrical samples) | Scint. LY (% of EJ-200)[1] | Fog temperature (° C.)[2] |
|---|---|---|---|
| Control | Control EJ-200 (ELJEN Tech.) | 100 | 40 |
| 5 | PVT (remainder of weight %), 4% 3P1P, 1% TEGDMA, 2% butyl-PBD, 0.1% bis-MSB | 92.6 | 0[3] |
| 6 | PSt, 10% 3P1P, 2% PPO, 0.08% bisMSB | 71.6 | 0[3] |
| 8 | PSt (remainder of weight %), 2.5% Triton X-100, 2% butyl-PBD, 0.1% bisMSB | 87.3 | <−20° C. |
| 9 | PVT (remainder of weight %), 2.5% Triton X-45, 2% butyl-PBD, 0.1% bisMSB | 87.8 | −20° C. |
| 10 | PSt (remainder of weight %), 5% 4-vinyl benzyl alcohol, 1% TEGDMA, 1% PPO, 0.04% bisMSB | 71.4 | <−20° C. |
| 11 | PSt, 1% p-tolylboronic acid, 1% TEGDMA, 2% PPO, 0.04% bisMSB | 73.3 | 20° C. |

[1]Scintillation Light Yield is post-saturation aging (at least 21 days at 55° C., 100% R.H).
[2]Temperature of first fog appearance.
[3]Estimated (no fog at 20° C., fog at −20° C.)

A lower fog temperature is better, and the results show surprisingly effective improvement in fog-resistance over the standard. EJ-200 is already fogged well above room temperature. Many examples did not show any fogging down to −20° C., which is the lowest temperature that could reasonably be achieved in the lab without possibly damaging the samples.

Example 12

Figure 5:
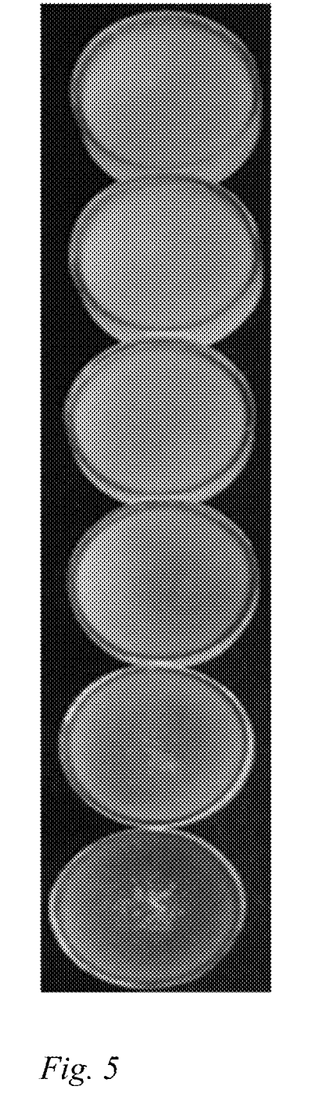
FIG. 5 is a photograph of a series of fog-resistant plastic scintillators with varying anti-fog agent contents.

In Example 12 a series of poly(styrene) plastic scintillators with 1% TEGDMA, 1% 2,5-diphenyloxazole and 0.1% bis-MSB were loaded with 0.5%, 0.6%, 0.7%, 0.8%, 0.9%, and 1.0% (w/w) p-tolylboronic acid. Photos of these samples in respective descending order with different anti-fog agent content are shown in FIG. 5.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

It is claimed:

1. A plastic scintillator comprising:
an aromatic polymeric matrix;
a primary and secondary fluorophore;
an anti-fog agent;
wherein the anti-fog agent is a chemical species that includes at least one of:
an aromatic group, a heteroaromatic group, a non-aromatic cyclic group or a non-aromatic heterocyclic group; and, in addition,
an oxygen-containing functional group;
optionally, a linking group is also included in the anti-fog agent and is selected from the group consisting of: a $C_1$ to $C_{20}$ alkyl group or chain, an ethylene glycol group, or a polyethylene glycol group;

wherein if the optional linking group is not present in the anti-fog agent, the aromatic group is bonded directly to the oxygen-containing functional group; and if the optional linking group is present in the anti-fog agent, the aromatic or heteroaromatic group is bonded to the optional linking group, and the oxygen-containing functional group is also bonded to the optional linking group.

2. The plastic scintillator of claim 1, wherein the anti-fog agent includes an aromatic group, an alkyl chain of at least 2 carbon atoms bonded to the aromatic group, and an oxygen-containing functional group bonded to the alkyl chain or aromatic group.

3. The plastic scintillator of claim 1, wherein the anti-fog agent is a nonionic surfactant.

4. The plastic scintillator of claim 3, wherein the linking group is present and comprises a hydrophilic polyethylene glycol chain, and the aromatic group comprises an aromatic hydrocarbon lipophilic or hydrophobic group.

5. The plastic scintillator of claim 1, wherein the anti-fog agent is 1,1,3,3-tetramethylbutyl)phenyl-polyethylene glycol.

6. The plastic scintillator of claim 3, wherein the plastic scintillator is exclusive of a crosslinking agent.

7. The plastic scintillator of claim 1, wherein the anti-fog agent is selected from the group consisting of:
(1,1,3,3-tetramethylbutyl)phenyl-polyethylene glycol, hydrocinnamic acid, benzyl alcohol, 2-phenylethan-1-ol, 3-phenylpropan-1-ol, 1,2-phenylenedimethanol, pyridine, 2-phenoxy-1-ethanol, phenylacetic acid, or combinations thereof.

8. The plastic scintillator of claim 1, wherein the anti-fog agent is present in a weight percentage of 0.5 to 10% by weight.

9. The plastic scintillator of claim 1, wherein the aromatic polymeric matrix comprises poly(styrene), poly(vinyltoluene), or mixtures thereof.

10. The plastic scintillator of claim 7, wherein the (1,1,3,3-tetramethylbutyl)phenyl-polyethylene glycol is selected and the average number of ethylene glycol units is 4 to 30.

11. The plastic scintillator of claim 1, wherein the primary fluorophore is selected from the group consisting of: 2,5-diphenyloxazole, 2,5-diphenyl-1,3,4-oxadiazole, 2-(4-tert-butylphenyl)-5-(4-biphenylyl)-1,3,4-oxadiazole, or p-terphenyl; and
the secondary fluorophore is selected from the group consisting of: 1,4-bis(5-phenyl-2-oxazolyl)benzene, 1,4-bis(2-methylstyrl)benzene, or 2-(1-naphthyl)-5-phenyloxazole.

12. A plastic scintillator comprising:
an aromatic polymeric matrix;
a primary and secondary fluorophore;
an anti-fog agent;
wherein the anti-fog agent is a chemical species that includes at least one of:
an aromatic group, a heteroaromatic group, a non-aromatic cyclic group or a non-aromatic heterocyclic group; and, in addition,
an oxygen-containing functional group;
optionally, a linking group is also included in the anti-fog agent and is selected from the group consisting of: a $C_1$ to $C_{20}$ alkyl group or chain, an ethylene glycol group, or a polyethylene glycol group;
wherein if the optional linking group is not present in the anti-fog agent, the aromatic group is bonded directly to the oxygen-containing functional group; and if the optional linking group is present in the anti-fog agent, the aromatic or heteroaromatic group is bonded to the optional linking group, and the oxygen-containing functional group is also bonded to the optional linking group;
wherein a polymer of the polymeric matrix has a weight average molecular (Mw) weight ranging from 40,000 to 1,000,000 g/mol.

13. The plastic scintillator of claim 1, further comprising a crosslinking agent.

14. A plastic scintillator comprising:
an aromatic polymeric matrix;
a primary and secondary fluorophore;
an anti-fog agent;
wherein the anti-fog agent is a chemical species that includes at least one of:
an aromatic group, a heteroaromatic group, a non-aromatic cyclic group or a non-aromatic heterocyclic group; and, in addition,
an oxygen-containing functional group;
optionally, a linking group is also included in the anti-fog agent and is selected from the group consisting of: a $C_1$ to $C_{20}$ alkyl group or chain, an ethylene glycol group, or a polyethylene glycol group;
wherein if the optional linking group is not present in the anti-fog agent, the aromatic group is bonded directly to the oxygen-containing functional group; and if the optional linking group is present in the anti-fog agent, the aromatic or heteroaromatic group is bonded to the optional linking group, and the oxygen-containing functional group is also bonded to the optional linking group;
wherein the plastic scintillator has a Shore D hardness according to ASTM D2240 00 of 15 or greater.

15. The plastic scintillator of claim 1, wherein the anti-fog agent is present in an amount of 0.1 to 30% by weight.

16. The plastic scintillator of claim 12, wherein the anti-fog agent is selected from the group consisting of: (1,1,3,3-tetramethylbutyl)phenyl-polyethylene glycol, hydrocinnamic acid, benzyl alcohol, 2-phenylethan-1-ol, 3-phenylpropan-1-ol, 1,2-phenylenedimethanol, pyridine, 2-phenoxy-1-ethanol, phenylacetic acid, o-tolylboronic acid, 2-methoxyboronic acid, and cyclohexylboronic acid, or combinations thereof.

17. The plastic scintillator of claim 12, wherein the anti-fog agent is present in a weight percentage of 0.1 to 30% by weight.

18. The plastic scintillator of claim 12, further comprising a crosslinking agent.

19. The plastic scintillator of claim 14, wherein the anti-fog agent is selected from the group consisting of: (1,1,3,3-tetramethylbutyl)phenyl-polyethylene glycol, hydrocinnamic acid, benzyl alcohol, 2-phenylethan-1-ol, 3-phenylpropan-1-ol, 1,2-phenylenedimethanol, pyridine, 2-phenoxy-1-ethanol, phenylacetic acid, o-tolylboronic acid, 2-methoxyboronic acid, and cyclohexylboronic acid, or combinations thereof.

20. The plastic scintillator of claim 14, wherein the anti-fog agent is present in a weight percentage of 0.1 to 30% by weight.

* * * * *